US008764099B2

(12) United States Patent
Suzuki

(10) Patent No.: US 8,764,099 B2
(45) Date of Patent: Jul. 1, 2014

(54) DOOR FRAME FOR VEHICLE

(71) Applicant: Aisin Seiki Kabushiki Kaisha, Kariya (JP)

(72) Inventor: Shunsuke Suzuki, Nishio (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 13/726,998

(22) Filed: Dec. 26, 2012

(65) Prior Publication Data

US 2013/0161980 A1     Jun. 27, 2013

(30) Foreign Application Priority Data

Dec. 27, 2011   (JP) ................. 2011-286719

(51) Int. Cl.
  *B60J 1/17*    (2006.01)
  *B60J 5/04*    (2006.01)

(52) U.S. Cl.
  USPC ............. 296/146.2; 296/146.6; 49/502

(58) Field of Classification Search
  USPC ........... 296/201, 146.2, 146.3, 146.5, 146.6; 49/502
  See application file for complete search history.

(56) References Cited

U.S. PATENT DOCUMENTS

| | | | |
|---|---|---|---|
| 8,322,078 B2* | 12/2012 | Brancaleone et al. | 49/502 |
| 2003/0097796 A1* | 5/2003 | Schutt et al. | 49/502 |
| 2003/0177702 A1* | 9/2003 | Hock et al. | 49/502 |
| 2003/0189357 A1* | 10/2003 | Patberg et al. | 296/146.6 |
| 2005/0102953 A1 | 5/2005 | Masunaga et al. | |
| 2010/0293863 A1 | 11/2010 | Okada et al. | |
| 2011/0042997 A1 | 2/2011 | Yamada et al. | |

FOREIGN PATENT DOCUMENTS

| | | |
|---|---|---|
| JP | 2005-132234 A | 5/2005 |
| JP | 2010-120571 A | 6/2010 |
| JP | 2011-042278 A | 3/2011 |

OTHER PUBLICATIONS

U.S. Appl. No. 13/727,045, filed Dec. 26, 2012, Shunsuke Suzuki.

* cited by examiner

Primary Examiner — Jason S Morrow
(74) Attorney, Agent, or Firm — Buchanan Ingersoll & Rooney PC

(57) ABSTRACT

A door frame for a vehicle includes a pillar portion, a main frame portion, an envelope portion provided at the main frame portion, serving as a framework of the main frame portion and opening to a vehicle outer side, a fixing portion, a bottom wall provided at the envelope portion and positioned at a vehicle inner side, an upper wall provided at the envelope portion and extending from an end portion of the bottom wall at a vehicle upper side towards the vehicle outer side, a lower wall provided at the envelope portion and extending from an end portion of the bottom wall at a vehicle lower side towards the vehicle outer side, and at least one reinforcement rib formed at the envelope portion, the reinforcement rib extending from the bottom wall towards the vehicle outer side and connecting the upper wall and the lower wall.

12 Claims, 8 Drawing Sheets

DOOR FRAME FOR VEHICLE

CROSS REFERENCE TO RELATED APPLICATIONS

This application is based on and claims priority under 35 U.S.C. §119 to Japanese Patent Application 2011-286719, filed on Dec. 27, 2011, the entire content of which is incorporated herein by reference.

TECHNICAL FIELD

This disclosure generally relates to a door frame for a vehicle.

BACKGROUND DISCUSSION

A known vehicle door in which a door frame constituting a window frame is fixed to a door body (door panel) provided at a vehicle body, the door body being selectively opened and closed relative to the vehicle body is disclosed in JP2010-120571A (i.e., hereinafter referred to as Patent reference 1), for example. The known door frame includes a pillar portion fixed to an upper end portion of the door body and extending in an upward direction of a vehicle, and a main frame portion connected to an upper end of the pillar portion and extending in a forward or rearward direction of the vehicle to be connected to the upper end portion of the door body.

A vacuum force in an outward direction of a vehicle acts on a vehicle door by a negative pressure generated by an airflow along the vehicle door, particularly, during a high speed running state of the vehicle. Further, because the door frame is fixed to the upper end portion of the door body, the vacuum force is applied to the door frame to bend towards an outward of the vehicle with a bottom end of the door frame as a fixed end. Because the main frame portion connects the door body and the upper end of the pillar portion and has a configuration which inclines in a front-rear direction of the vehicle, the main frame portion is twisted by the vacuum force to be bent towards the outward of the vehicle. Thus, it is desirable that the main frame portion has high rigidity against a torsional force. In many cases, an envelope portion forming a framework of the main frame portion includes a closed cross-section, for example, a cross-section formed by four bars formed in a rectangular shape (e.g., Patent reference 1).

Further enhancement of the rigidity of the door frame for the vehicle has been required. However, according to the construction disclosed in Patent reference 1, because the envelope portion of the main frame portion is formed in the closed cross-section, in order to enhance the rigidity of the main frame portion, a thickness of the main frame portion needs to be increased, which may cause a significant increase in weight of the door frame.

A need thus exists for a door frame for a vehicle which is not susceptible to the drawback mentioned above.

SUMMARY

In light of the foregoing, the disclosure provides a door frame for a vehicle, which includes a pillar portion fixed to an upper end portion of a door body and extending in an upward direction of the vehicle, a main frame portion connected to an upper end of the pillar portion and extending in a forward direction or a rearward direction of the vehicle to be fixed to the upper end portion of the door body, an envelope portion provided at the main frame portion, the envelope portion serving as a framework of the main frame portion and opening to a vehicle outer side, a fixing portion provided at the main frame portion, the fixing portion fixing a holding member for holding a glass run channel together with the envelope portion, a bottom wall provided at the envelope portion and positioned at a vehicle inner side, an upper wall provided at the envelope portion and extending from an end portion of the bottom wall at a vehicle upper side towards the vehicle outer side, a lower wall provided at the envelope portion and extending from an end portion of the bottom wall at a vehicle lower side towards the vehicle outer side, and at least one reinforcement rib formed at the envelope portion, the reinforcement rib extending from the bottom wall towards the vehicle outer side and connecting the upper wall and the lower wall.

According to another aspect of the disclosure, a door frame for a vehicle, includes a pillar portion fixed to an upper end portion of a door body and extending in an upward direction of the vehicle, a main frame portion connected to an upper end of the pillar portion and extending in a forward direction or a rearward direction of the vehicle to be fixed to the upper end portion of the door body, an envelope portion provided at the main frame portion, the envelope portion serving as a framework of the main frame portion and opening to a vehicle outer side, a fixing portion provided at the main frame portion, the fixing portion fixing a holding member for holding a glass run channel together with the envelope portion, a bottom wall provided at the envelope portion and positioned at a vehicle inner side, an upper wall provided at the envelope portion and extending from an end portion of the bottom wall at a vehicle upper side towards the vehicle outer side, a lower wall provided at the envelope portion and extending from an end portion of the bottom wall at a vehicle lower side towards the vehicle outer side, and a retaining rib formed at the envelope portion, extending towards the vehicle outer side, and retaining the glass run channel between the upper wall and the lower wall.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
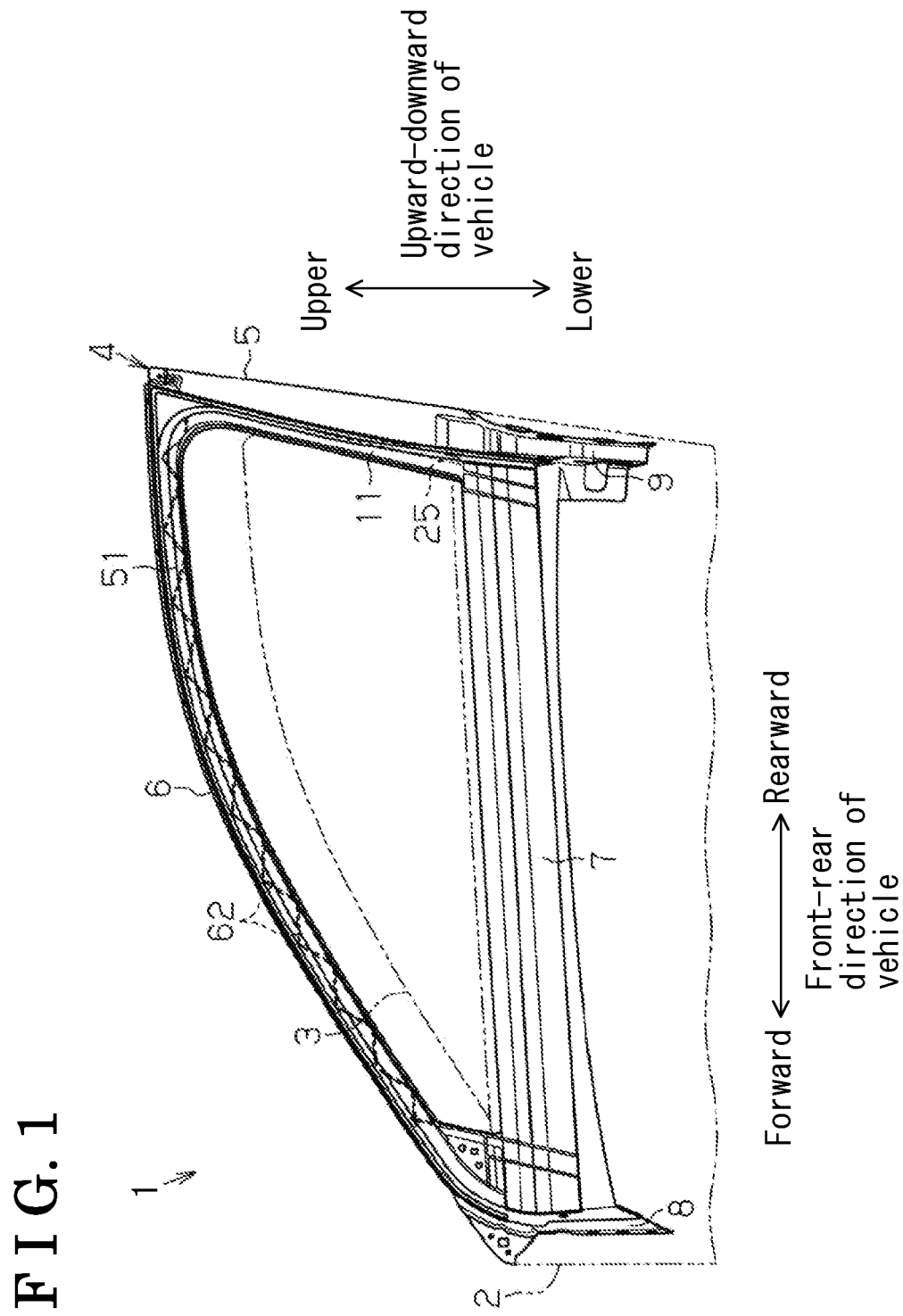
FIG. 1 is a front view of a front door which is viewed from an inside of a vehicle according to an embodiment disclosed here.

A door frame for a vehicle according to an embodiment applied to a front door that serves as a vehicle door will be explained with reference to the attached drawings. In the embodiment, directions and orientations, i.e., front, rear, top, bottom, upper, and lower, for example, correspond to those of a vehicle unless otherwise specified. As illustrated in FIG. 1, a front door 1 serving as a vehicle door includes a door body 2 serving as a door panel attached to a vehicle body, the door body 2 being selectively opened and closed relative to the vehicle body. The door body 2 is formed in an envelope form including a door outer panel and a door inner panel being joined to each other. A window glass 3 is configured to selectively project and retract relative to an opening portion formed at an upper end of the door body 2.

The front door 1 includes a door frame 4 fixed to an upper end portion of the door body 2 and constituting a window frame of the front door 1, i.e., a frame of the window glass 3. The door frame 4, which is made of light alloy, for example, aluminum alloy or magnesium alloy, integrally includes a pillar portion 5 and a main frame portion 6. The pillar portion 5 is fixed to an upper rear end portion of the door body 2 while extending in an upward direction of the vehicle. The main frame portion 6, which is connected to an upper end of the pillar portion 5, is formed in a substantially arched shape to curve in a downward direction of the vehicle while extending in a forward direction of the vehicle and is fixed to an upper front end portion of the door body 2. An inner reinforcement 7 connecting respective lower ends of the pillar portion 5 and the main frame portion 6, a hinge bracket 8 provided at a front end of the inner reinforcement 7, and a lock reinforcement 9 provided at a rear end of the inner reinforcement 7 are integrally formed at the door frame 4 so that the pillar portion 5 and the main frame portion 6 of the door frame 4, for example, are reinforced. Further, fittings such as a garnish or a glass run channel, for example, may be assembled to the door frame 4.

Figure 2:
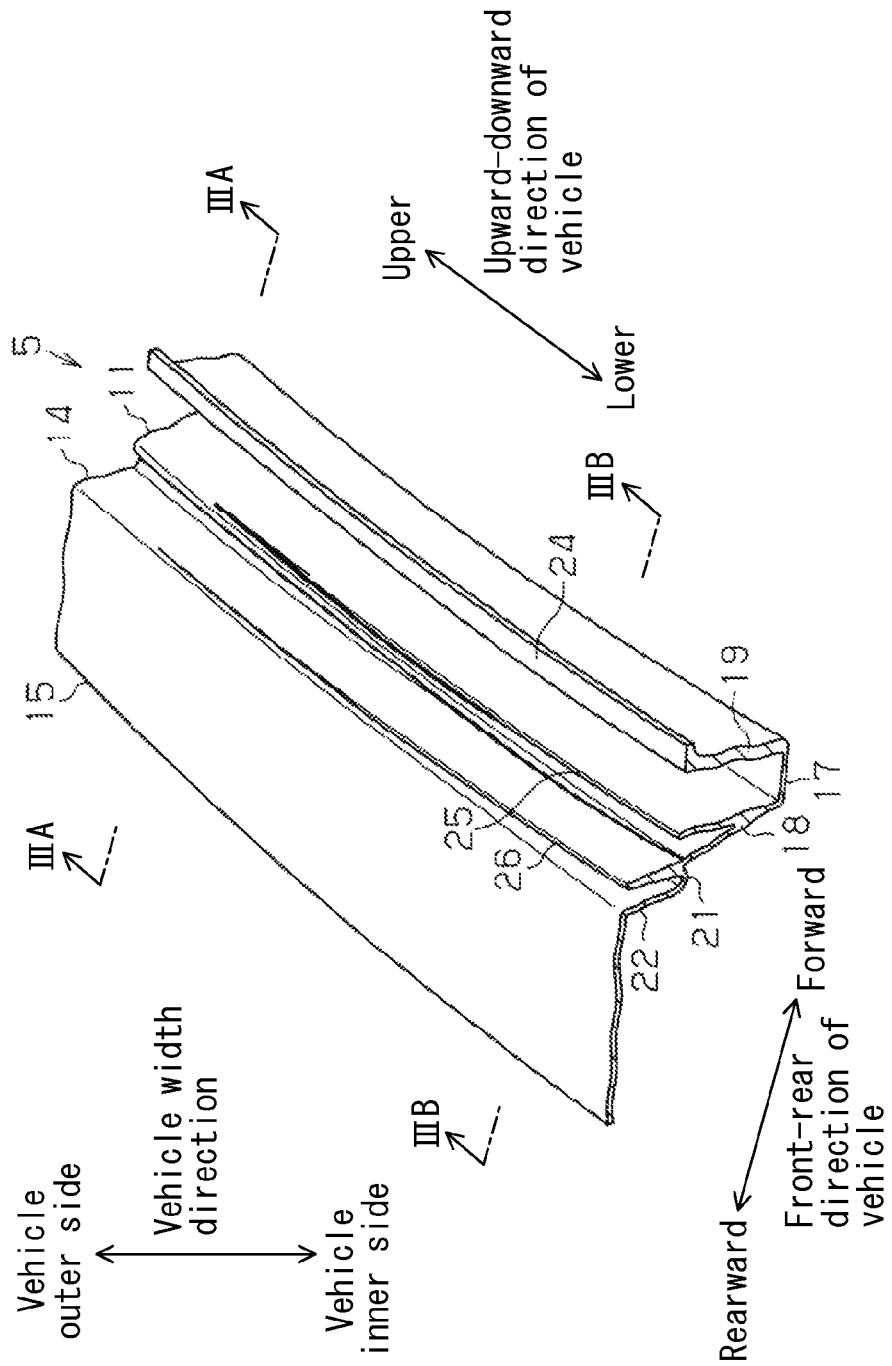
FIG. 2 is an enlarged perspective view of a pillar portion which is viewed from an outside of the vehicle according to the embodiment disclosed here.

A configuration of the pillar portion 5 will be explained in detail hereinafter. As illustrated in FIG. 2, the pillar portion 5 includes an envelope portion 11 (envelope portion 11 at pillar portion 5), a fixing portion 14 (fixing portion 14 at pillar portion 5), and a vehicle outside portion 15. The envelope portion 11 serving as a framework of the pillar portion 5 extends in an upward-downward direction of the vehicle and opens in an outward direction of the vehicle. The fixing portion 14 is fixed to a holding member 13 (holding member 13 at pillar portion 5) (see FIGS. 3A, 3B) which holds a glass run channel 12 together with the envelope portion 11. The vehicle outside portion 15 is connected to the fixing portion 14 and is positioned at a vehicle outer side relative to the envelope portion 11.

Figure 3A:
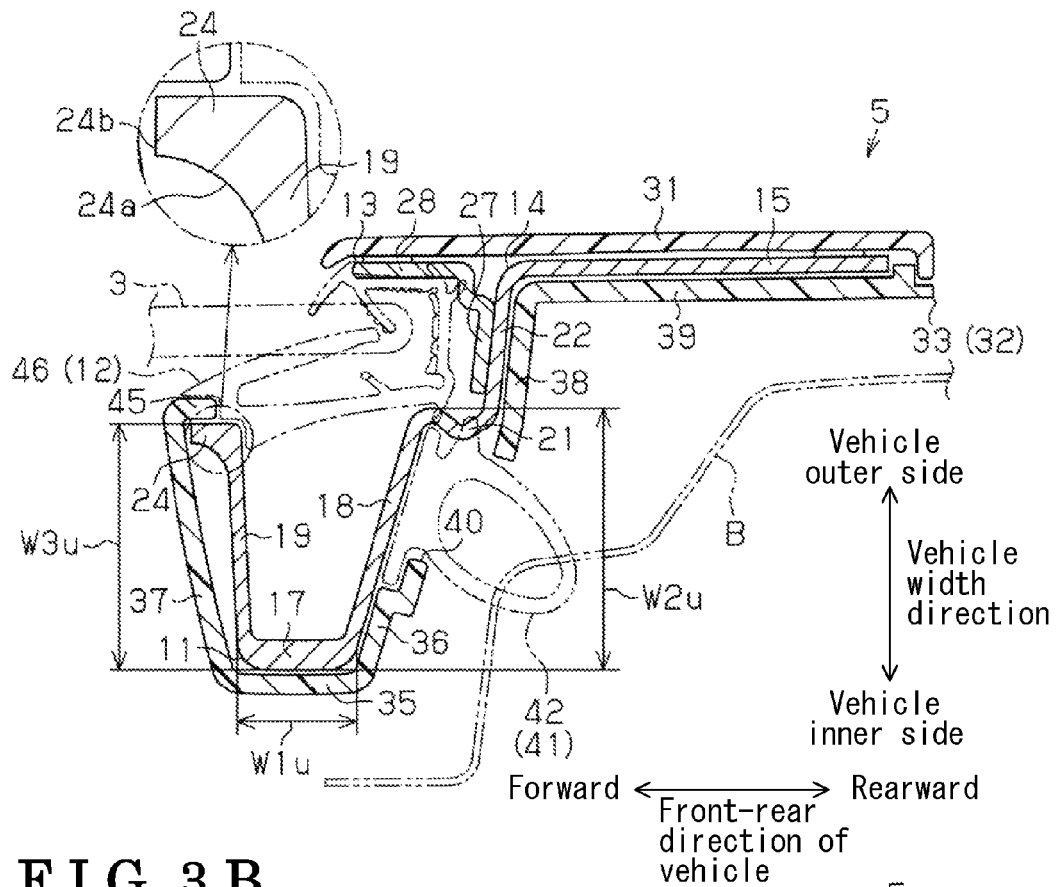
FIG. 3A is a cross-sectional view of the pillar portion at an upper end thereof taken along line IIIA-IIIA in FIG. 2 in a state where fittings are assembled according to the embodiment disclosed here.
Figure 3B:
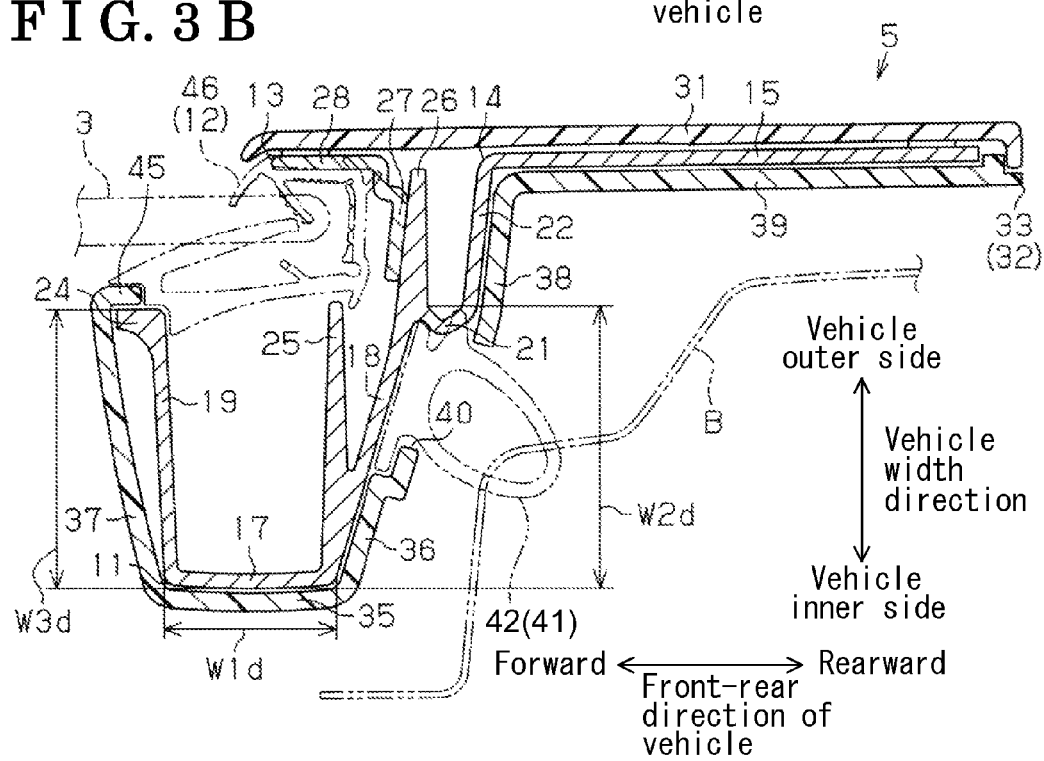
FIG. 3B is a cross-sectional view of the pillar portion at a door body side taken along line IIIB-IIIB in FIG. 2 in the state where fittings are assembled according to the embodiment disclosed here.

Particularly, as illustrated in FIGS. 3A and 3B, the envelope portion 11 includes a bottom wall 17, an outer wall 18, and an inner wall 19. The bottom wall 17, which is positioned at a vehicle inner side, extends in a front-rear direction of the vehicle in a cross section. The outer wall 18 extends towards the vehicle outer side (outside of the vehicle) from an end portion of the bottom wall 17 at a vehicle rear side (i.e., at an outer side of the door frame 4) in a cross section. The inner wall 19 extends towards the vehicle outer side (outward of the vehicle) from an end portion of the bottom wall 17 at a vehicle front side (i.e., at an inner side of the door frame 4) in a cross section. That is, the envelope portion 11 is formed in an open cross section, i.e., in a substantially U-shape in a cross section. The outer wall 18 is formed to incline in a rearward direction of the vehicle relative to the bottom wall 17 (i.e., the outer wall 18 slightly leans in a rearward direction of the vehicle relative to a vertical direction relative to the bottom wall 17) while the inner wall 19 is formed to be substantially perpendicular to the bottom wall 17. A distance between the outer wall 18 and the inner wall 19 gradually increases towards the vehicle outer side from the bottom wall 17. Further, a distance between the outer wall 18 and the inner wall 19 in an upward-downward direction of the vehicle gradually increases towards the downward, that is, as being closer to the door body 2.

The fixing portion 14 includes a lateral wall 21 extending from an end portion of the outer wall 18 at the vehicle outer side towards the vehicle rear side and a vertical wall 22 extending from an end portion of the lateral wall 21 at the vehicle rear side (i.e., at the outer side of the door frame 4) towards the vehicle outer side. The lateral wall 21 is formed in an arc shape in a cross section which is dented towards the vehicle inner side. The vehicle outside portion 15 extends in the front-rear direction of the vehicle in a cross section so that a width of the vehicle outside portion 15 in front-rear direction of the vehicle gradually increases towards the door body 2 from an upper end of the pillar portion 5.

The bottom wall 17 is formed so that a width of the bottom wall 17 in the front-rear direction of the vehicle gradually increases towards the door body 2 from the upper end of the pillar portion 5. Specifically, a width W1$d$ of the bottom wall 17 in the front-rear direction of the vehicle at a position close to the door body 2 as illustrated in FIG. 3B is greater than a width W1$u$ of the bottom wall 17 in the front-rear direction of the vehicle at an upper end portion of the pillar portion 5 as illustrated in FIG. 3A.

The outer wall 18 is formed so that a width of the outer wall 18 in a width direction of the vehicle gradually increases towards the door body 2 from the upper end of the pillar portion 5. Specifically, a width W2$d$ of the outer wall 18 in the vehicle width direction at the position close to the door body 2 as illustrated in FIG. 3B is greater than a width W2$u$ of the outer wall 18 in the vehicle width direction at the upper end portion of the pillar portion 5 as illustrated in FIG. 3A. In a similar manner, the inner wall 19 is formed so that a width of the inner wall 19 in the vehicle width direction gradually increases towards the door body 2 from the upper end of the pillar portion 5. Specifically, a width W3$d$ of the inner wall 19 in the vehicle width direction at a position closer to the door body 2 as illustrated in FIG. 3B is greater than a width W3$u$ of the inner wall 19 in the vehicle width direction at the upper end portion of the pillar portion 5 as illustrated in FIG. 3A.

Further, as illustrated by an enlarged view in FIG. 3A, an inner extending portion 24 is formed at an end portion of the inner wall 19 at the vehicle outer side so as to extend in the forward direction of the vehicle (i.e., at the inner side of the door frame 4). An end surface of the end portion of the inner wall 19 at the vehicle outer side and an end surface of the inner extending portion 24 at the vehicle outer side are formed to be coplanar to each other. The extending amount of the inner extending portion 24 in the forward direction of the vehicle gradually increases towards the vehicle outer side. Specifically, an inner side surface 24a of the inner extending portion 24 is formed in an arc shape gradually being closer to the inner wall 19 from a front end surface 24b towards the vehicle inner side. The inner extending portion 24 is formed to have a constant cross section over an entire length of the pillar portion 5.

As illustrated in FIGS. 2, 3A and 3B, a first rib (an envelope portion rib) 25, which projects from the outer wall 18 to the vehicle outer side, is formed at the envelope portion 11. Specifically, the first rib 25 is branched from a portion of the outer wall 18 so as to extend in the upward-downward direction of the vehicle while a distance between the first rib 25 and the inner wall 19 in the front-rear direction of the vehicle is constant. That is, the first rib 25 and the outer wall 18 are integrated at an upper side of the vehicle. In addition, the first rib 25 is formed so that a distance from the bottom wall 17 to an end portion of the first rib 25 at the vehicle outer side is assumed to be substantially the same as a distance from the bottom wall 17 to the end portion of the outer wall 18 at the vehicle outer side.

A second rib (a fixing portion rib) 26, which projects from the lateral wall 21 to the vehicle outer side, is formed at the fixing portion 14. The second rib 26 at the fixing portion 14 is branched from a portion of the vertical wall 22 so as to extend in the upward-downward direction of the vehicle while a distance between the second rib 26 and the inner wall 19 in the front-rear direction of the vehicle is constant. The second rib 26 is formed to divide the lateral wall 21 into a vehicle front side portion and a vehicle rear side portion. That is, the second rib 26 is integrated with the vertical wall 22 at the upper side of the vehicle. Further, the second rib 26 is formed so that a distance from the lateral wall 21 to an end portion of the second rib 26 at the vehicle outer side is assumed to be substantially the same as a distance from the lateral wall 21 to an end portion of the vertical wall 22 at the vehicle outer side.

As illustrated in FIGS. 3A and 3B, the holding member 13 includes a fixed portion 27 extending in the vehicle width direction in a cross section and a holding portion 28 extending in the forward direction of the vehicle from an end portion of the fixed portion 27 at the vehicle outer side in a cross section. The holding member 13 is formed in a substantially L-shape in a cross section. The holding member 13 is formed by rolling of a metal plate, for example. The holding member 13 is formed in a constant cross section over an entire length thereof. The fixed portion 27 of the holding member 13 is fixed to the second rib 26 and to an upper portion of the vertical wall 22 (i.e., a portion higher than a position at which the second rib 26 is branched from the vertical wall 22) by welding, for example.

An outer garnish 31 is attached to the pillar portion 5 so as to cover the pillar portion 5 from the vehicle outer side. The outer garnish 31 is formed by a plate member made of synthetic resin, for example. The outer garnish 31, which extends in the front-rear direction of the vehicle in a cross section, covers the vehicle outside portion 15 of the pillar portion 5 and the holding portion 28 of the holding member 13. An inner garnish 32 is attached to the pillar portion 5 so as to cover the pillar portion 5 from the vehicle inner side. The inner garnish 32 is formed by a plate member made of synthetic resin, for example.

The inner garnish 32 integrally includes a pillar portion covering portion 33 and a main frame covering portion 34 (see FIGS. 5A, 5B) covering the pillar portion 5 and the main frame portion 6, respectively. The pillar portion covering portion 33 integrally includes a bottom wall covering portion 35 covering the bottom wall 17 of the envelope portion 11, an outer wall covering portion 36 extending to the vehicle outer side from an end portion of the bottom wall covering portion 35 at the vehicle rear side (i.e., at the outer side of the door frame 4) to cover the outer wall 18, and an inner wall covering portion 37 extending to the vehicle outer side from an end portion of the bottom wall covering portion 35 at the vehicle front side (i.e., at the inner side of the door frame 4) to cover the inner wall 19.

A fixing portion covering portion 38 and a vehicle outside portion covering portion 39 are integrally formed at an end portion of the outer wall covering portion 36 at the vehicle outer side. The fixing portion covering portion 38 further extends to the vehicle outer side to cover the fixing portion 14. The vehicle outside portion covering portion 39 extends to the vehicle rear side from an end portion of the fixing portion covering portion 38 at the vehicle outer side to cover the vehicle outside portion 15. An engagement opening 40 is formed at the outer wall covering portion 36 so as to extend in the upward-downward direction of the vehicle. A weather strip 41 is arranged within the engagement opening 40 to elastically make contact with an opening portion B of the vehicle body to thereby restrain water from entering a vehicle interior. The weather strip 41, which is made of rubber material, for example, integrally includes a pillar portion attachment portion 42 attached to the pillar portion 5 and a main frame attachment portion 43 (see FIGS. 5A, 5B) attached to the main frame portion 6. Each of the pillar portion attachment portion 42 and the main frame attachment portion 43 is formed in a constant cross section over the entire length thereof.

An end portion of the inner wall covering portion 37 at the vehicle outer side is bent in the rearward direction of the vehicle to form a protruding portion (stopper portion) 45. The protruding portion 45 engages with the inner extending portion 24 of the inner wall 19. The glass run channel 12 that elastically makes contact with the window glass 3 engages with the holding portion 28 of the holding member 13, an upper portion of the lateral wall 21 (i.e., a portion higher than a position at which the first rib 25 is branched from the outer wall 18), the end portion of the first rib 25 at the vehicle outer side, the end portion of the inner wall 19 at the vehicle outer side, and the protruding portion 45 of the inner garnish 32 so as to be attached to the pillar portion 5. The glass run channel 12, which is made of rubber material, for example, integrally includes a pillar portion attachment portion 46 attached to the pillar portion 5 and a main frame attachment portion 47 (see FIGS. 5A, 5B) attached to the main frame portion 6. Each of the pillar portion attachment portion 46 and the main frame attachment portion 47 is formed in a constant cross section over the entire length thereof.

Figure 4A:
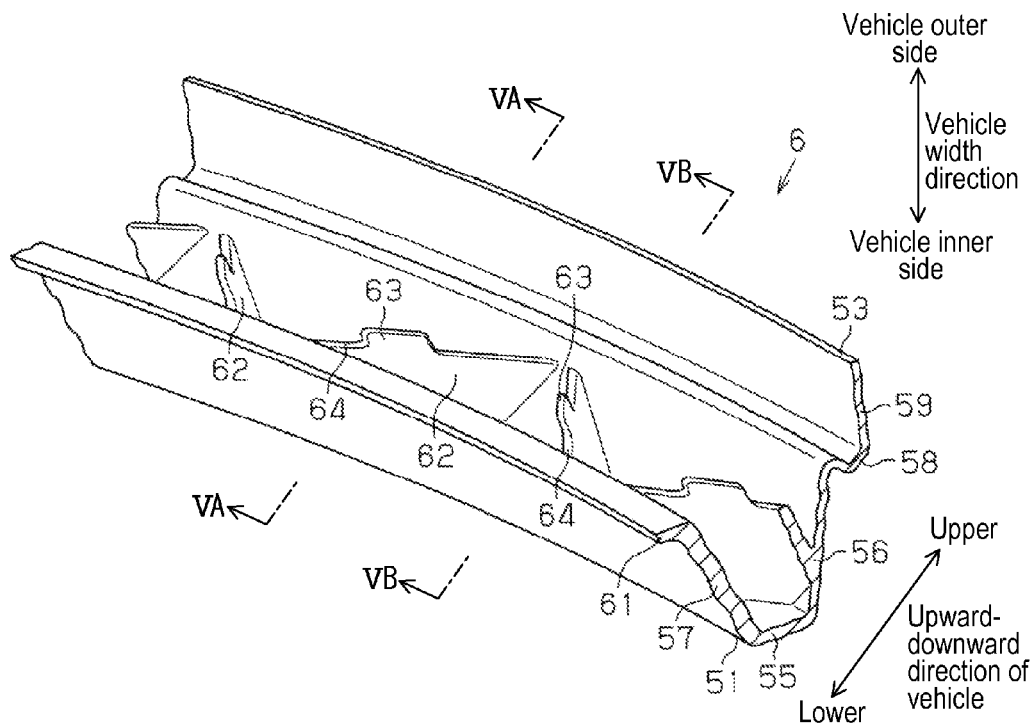
FIG. 4A is an enlarged perspective view of a main frame portion viewed from the outside of the vehicle according to the embodiment disclosed here.
Figure 4B:
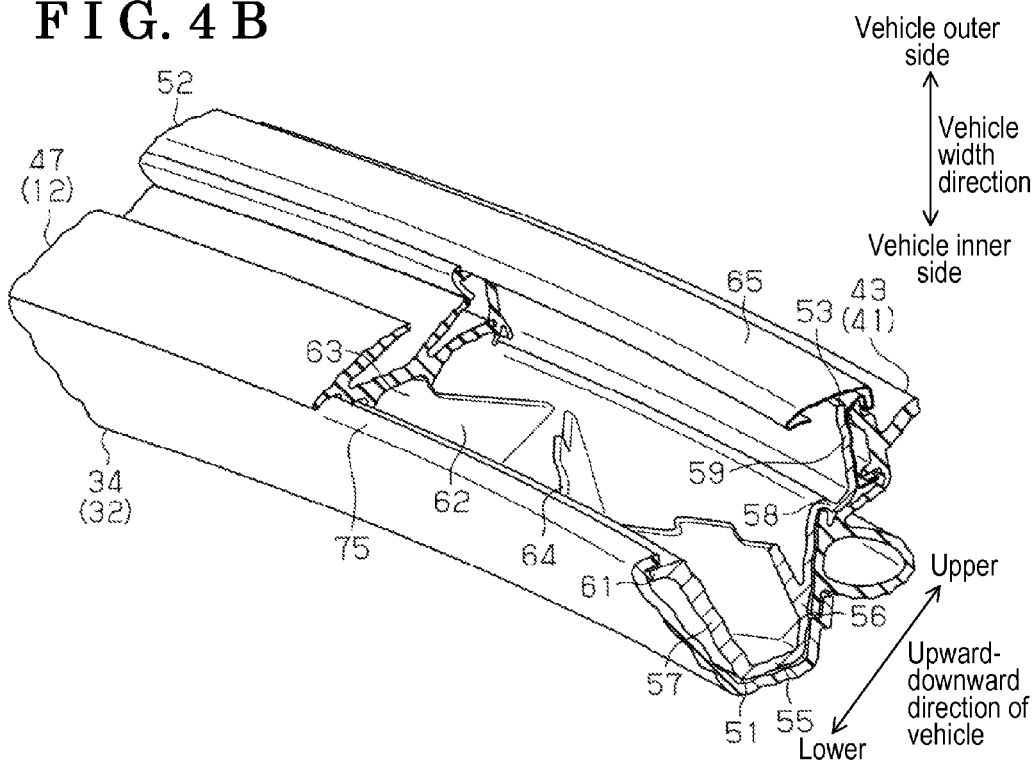
FIG. 4B is an enlarged perspective view of the main frame portion viewed from the outside of the vehicle in a state where fittings are assembled according to the embodiment disclosed here.

A construction of the main frame portion 6 will be explained in detail hereinafter. As shown in FIGS. 4A and 4B, the main frame portion 6 includes an envelope portion 51 (envelope portion 51 at main frame portion 6) and a fixing portion 53 (fixing portion 53 at main frame portion 6). The envelope portion 51 serving as a framework extends in the front-rear direction of the vehicle and opens to the vehicle outer side. A holding member (frame molding) 52 at the main frame portion 6 for holding, or retaining the glass run channel 12 together with the envelope portion 51 is fixed to the fixing portion 53.

Figure 5A:
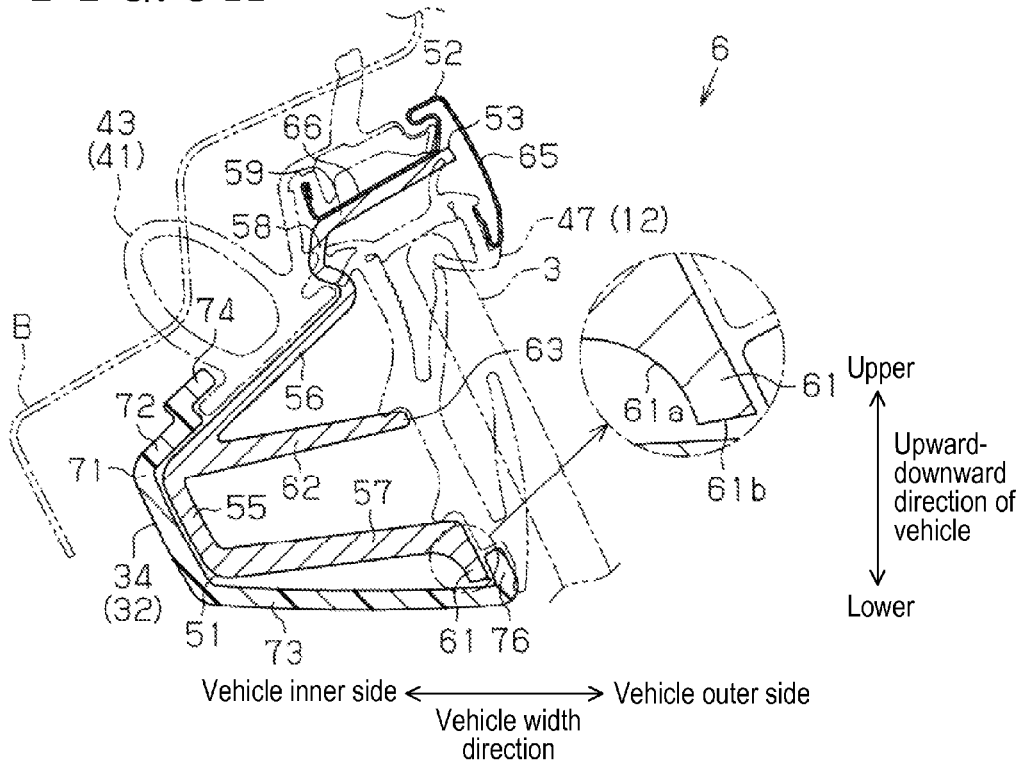
FIG. 5A is a cross-sectional view of the main frame portion showing a reinforcement rib at a retaining portion taken along line VA-VA in FIG. 4A in a state where fittings are assembled according to the embodiment disclosed here.
Figure 5B:
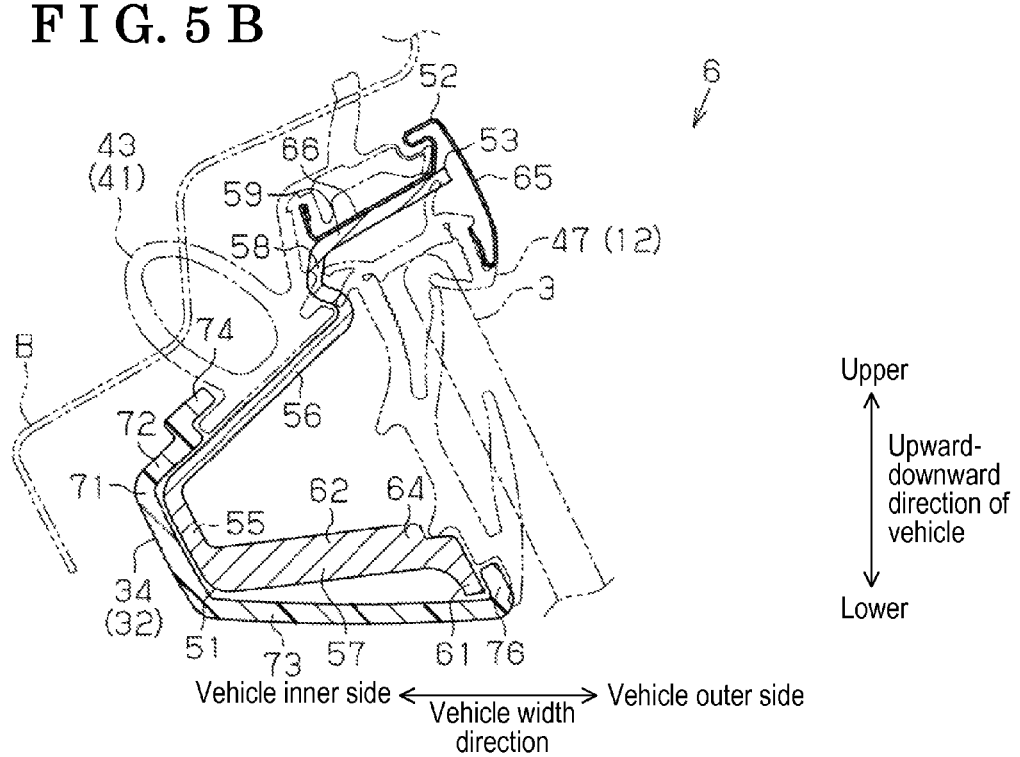
FIG. 5B is a cross-sectional view of the main frame portion showing the reinforcement rib at a connecting portion taken along line VB-VB in FIG. 4A in the state where fittings are assembled according to the embodiment disclosed here.

As shown in FIGS. 5A and 5B, the envelope portion 51 includes a bottom wall 55 positioned at a vehicle inner side and extends in the front-rear direction of the vehicle in a cross section, an upper wall 56 extending from an upper end portion of the bottom wall 55 (i.e., at the outer side of the door frame 4) to the vehicle outer side, and a lower wall 57 extending from a lower end portion of the bottom wall 55 (i.e., at the inner side of the door frame 4) to the vehicle outer side. That is, the envelope portion 51 includes an open cross section, which is formed in a substantially U-shape in cross section. The upper wall 56 is formed to incline relative to the bottom wall 55 (i.e., the upper wall 56 leans in an upward direction of the vehicle relative to the bottom wall 55), while the lower wall 57 inclines towards a downward direction of the vehicle relative to the bottom wall 55 (i.e., the lower wall 57 leans in the downward direction provided that the bottom wall 55 is vertically arranged). Thus, a distance between the upper wall 56 and the lower wall 57 in the upward-downward direction gradually increases towards the vehicle outer side from the bottom wall 55 (i.e., a distance between the upper wall 56 and the lower wall 57 in the upward-downward direction gradually increases as being closer to the vehicle outer side from the bottom wall 55). The envelope portion 51 at the main frame portion 6 is continuously formed from the envelope portion 11 of the pillar portion 5 at an upper end of the pillar portion 5. A connecting portion of the envelope portion 51 at the main frame portion 6 and the envelope portion 11 of the pillar portion 5 is curved in an arc shape (see FIG. 1).

The fixing portion 53 at the main frame portion 6, which serves as a fixing portion, includes a lateral wall 58 which extends in an upward direction of the vehicle from an end portion of the upper wall 56 at the vehicle outer side, and a longitudinal wall 59 extended towards the vehicle outer side from an upper end portion of the lateral wall 58. The lateral wall 58 is formed in a substantially arced shape in cross section which is dented towards the vehicle inner side. The fixing portion 53 at the main frame portion 6 is continuously formed from an upper end of the fixing portion 14 of the pillar portion 5.

As illustrated in FIG. 5A as an enlarged view, a downwardly extending portion 61 serving as an extending portion which extends in a downward direction of the vehicle is formed at an end portion of the lower wall 57 of the vehicle outer side. The end portion of the lower wall 57 at the vehicle outer side and an end surface of the downwardly extending portion 61 at the vehicle outer side are formed to be coplanar to each other. An extending amount of the downwardly extending portion 61 in the downward direction of the vehicle gradually increases towards the vehicle outer side (an extending amount of the downwardly extending portion 61 in the downward direction of the vehicle gradually increases as being closer to the vehicle outer side). Specifically, an inner side surface 61a of the downwardly extending portion 61 is formed in an arc shape gradually being close to the lower wall 57 from an end surface 61b at the vehicle downward side towards the vehicle inner side.

As shown in FIGS. 4A and 4B, plural reinforcement ribs 62 extending from the bottom wall 55 towards the vehicle outer side and connecting the upper wall 56 and the lower wall 57 are formed on the envelope portion 51 at the main frame portion 6. Specifically, the reinforcement rib 62 is formed in a substantially quadrilateral shape, and is arranged in a zigzag pattern along a longitudinal direction of the main frame portion 6. Namely, the envelope portion 51 at the main frame portion 6 is constructed by arranging and connecting substantially triangular tubes schematically describing, which is formed by the reinforcement ribs 62 and main frame portion 6, each having a bottom and opening towards the vehicle outer side in a manner that apices are arranged to face opposite directions from one another alternately.

A retaining portion 63 is formed at an upper end of the reinforcement rib 62 to protrude towards the vehicle outer side. The retaining portion 63 is configured so that the main frame attachment portion 47 of the glass run channel 12 is retained thereto. As illustrated in FIG. 5A, the retaining portion 63 is formed at a position so that an end portion of the retaining portion 63 closer to the upper wall 56 is positioned around a center of the envelope portion 51 at the main frame portion 6 in the upward-downward direction. Accordingly, the main frame attachment portion 47 of the glass run channel 12 is retained by the retaining portion 63 at a substantially center of the envelope portion 51 at the main frame portion 6 in the upward-downward direction of the vehicle. As illustrated in FIG. 5B, a connecting portion 64 of the reinforcement rib 62, which is connected to the lower wall 57, is formed in a recessed manner in the vehicle inner side relative to the end portion of the lower wall 57 at the vehicle outer side. Accordingly, the glass run channel 12 and the reinforcement rib 62 do not interfere with each other at the end portion of the lower wall 57 at the vehicle outer side.

As illustrated in FIGS. 5A and 5B, the holding member 52 at the main frame portion 6, which serves as a holding member, integrally includes a design portion 65 and a weather strip holding portion 66. The design portion 65 is positioned at the fixing portion 53 at the main frame portion 6 at the vehicle outer side and extends in the upward-downward direction of the vehicle in a cross section. The weather strip holding portion 66, which is formed in a substantially U-shape opening to the vehicle inner side in cross section, extends from an upper end portion of the design portion 65 towards the vehicle inner side. The holding member 52 at the main frame portion 6 is formed by rolling of a metal plate, for example. The holding member 52 at the main frame portion 6 is formed to have a constant cross section over an entire length thereof. The holding member 52 at the main frame portion 6 is fixed to the longitudinal wall 59 by fixing the weather strip holding portion 66 onto an upper surface of the longitudinal wall 59, for example, by welding.

The main frame covering portion 34 of the inner garnish 32 is attached to the main frame portion 6. The main frame covering portion 34 integrally includes a bottom wall covering portion 71, an upper wall covering portion 72, and a lower wall covering portion 73. The bottom wall covering portion 71 covers a substantially entire portion of the bottom wall 55 of the envelope portion 51 at the main frame portion 6. The upper wall covering portion 72 extends from an upper end portion of the bottom wall covering portion 71 towards the vehicle outer side and covers a portion of the upper wall 56. The lower wall covering portion 73 extends from a lower end portion of the bottom wall covering portion 71 towards the vehicle outer side and covers the lower wall 57.

A stepped portion 74 is formed at an end portion of the upper wall covering portion 72 at the vehicle outer side. The stepped portion 74 is positioned to have a clearance relative to the upper wall 56. The main frame attachment portion 43 of the weather strip 41 is engaged with the stepped portion 74 and with the holding portion 66 of the holding member 52 at the main frame portion 6 so as to be attached to the main frame portion 6.

An end portion of the lower wall covering portion 73 at the vehicle outer side is bent in the upward direction of the vehicle to form a protruding portion (stopper portion) 76. The main frame attachment portion 47 of the glass run channel 12 is engaged with the design portion 65 of the holding member 52 at the main frame portion 6, the lateral wall 58, the retaining portion 63 of the reinforcement rib 62, the end portion of the lower wall 57 at the vehicle outer side, and the protruding portion 76 of the inner garnish 32 so as to be attached to the main frame portion 6.

Figure 6:
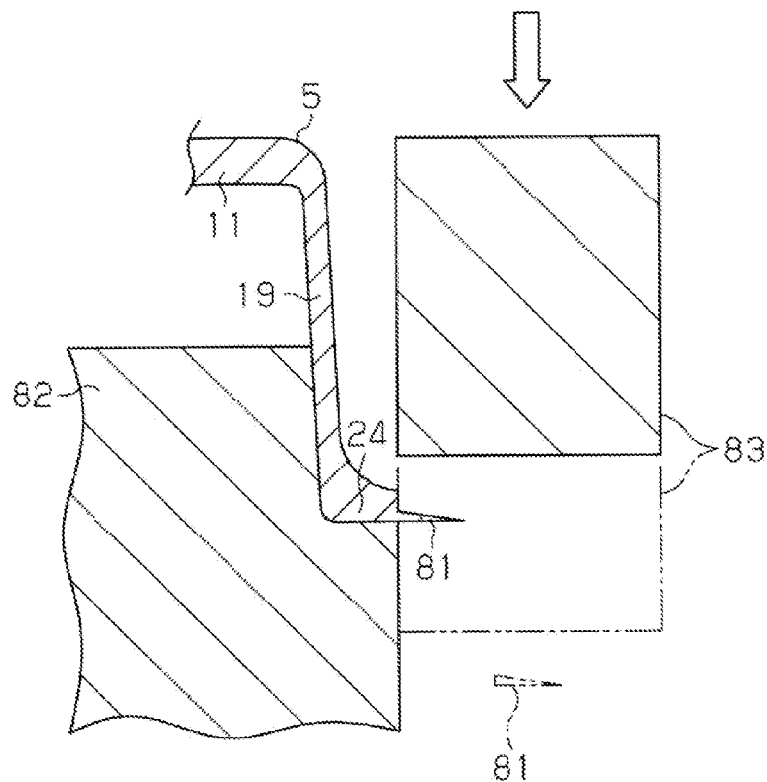
FIG. 6 is a schematic view of an inner extending portion of the pillar portion when removing a burr according to the embodiment disclosed here.

A manufacturing method of the door frame 4 will be explained hereinafter. The pillar portion 5, the main frame portion 6, the inner reinforcement 7, the hinge bracket 8, and the lock reinforcement 9 are integrally formed by light alloy die-casting to obtain the door frame 4. As illustrated in FIG. 6, a burr 81 is formed at the end portion of the inner wall 19 at the vehicle outer side while projecting towards the inner side of the door frame 4 (forward of the vehicle). Similarly, a burr projecting in the downward direction of the vehicle is formed at the end portion of the lower wall 57 at the vehicle outer side. Thus, according to the embodiment, after the door frame 4 is removed from a die cast mold, the end portion of the inner wall 19 at the vehicle outer side and the inner extending portion 24 are brought to contact a support 82 to thereby secure the pillar portion 5. Then, the burr 81 is sheared by a jig 83 to be removed from the inner wall 19. A burr formed at the lower wall 57 is removed in a similar manner in a state where the main frame portion 6 is fixed to the support. Consecutively, after fixing the holding member 13 to the pillar portion 5 and fixing the holding member 52 to the main frame portion 6, the outer garnish 31 and the inner garnish 32 are attached to the door frame 4.

Figure 7:
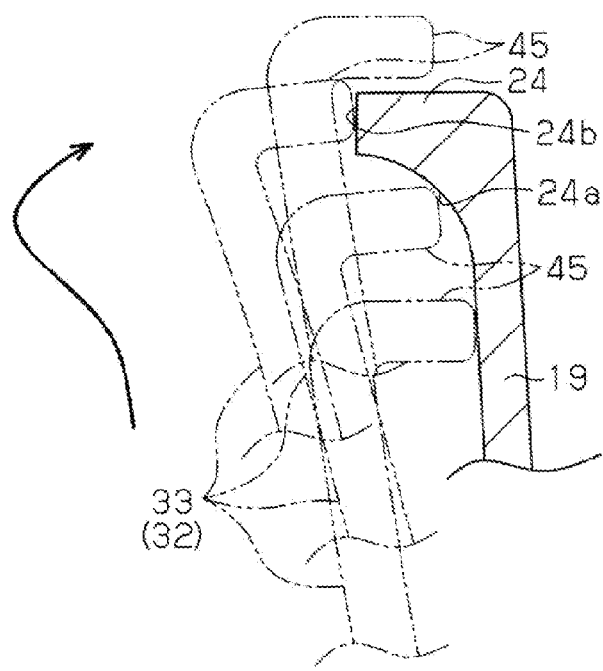
FIG. 7 is a schematic view of a vicinity of the inner extending portion of the pillar portion when attaching an inner garnish according to the embodiment disclosed here.

The inner garnish 32 is attached to the door frame 4 in a manner that the protruding portion 45 of the pillar portion covering portion 33 is pushed from the vehicle inner side to fit along the inner wall 19, and the protruding portion 76 of the main frame covering portion 34 is pushed from the vehicle inner side to fit along the lower wall 57. Specifically, as illustrated in FIG. 7, because the inner extending portion 24 is formed in a manner that the extending amount of the inner extending portion 24 gradually increases towards the vehicle forward side, the protruding portion 45 moves along a profile of the inner wall 19 to engage with the inner extending portion 24 after moving along the inner side surface 24a and the front end surface 24b. Thus, the pillar portion covering portion 33 of the inner garnish 32 is attached to the pillar portion 5. Similarly, the protruding portion 76 of the main frame covering portion 34 moves along the lower wall 57 to engage with the downwardly extending portion 61 so that the main frame covering portion 34 is attached to the main frame portion 6. Thereafter, the glass run channel 12 and the weather strip 41 are attached to the door frame 4.

As explained above, the following effects and advantages can be attained according to the construction of the embodiment.

According to the construction of the embodiment, by forming the plural reinforcement ribs 62, which extend from the bottom wall 55 towards the vehicle outer side, connect the upper wall 56 and the lower wall 57, and are arranged in the zigzag pattern on the envelope portion 51 at the main frame portion 6 and by forming the envelope portion 51 to have a schematically configuration that plural substantially triangular tubes which open to the vehicle outer side are combined, rigidity of the main frame portion 6 against a torsional force is enhanced. Thus, because it is not necessary to increase a thickness of the envelope portion 51 at the main frame portion 6, the rigidity of the main frame portion 6 can be enhanced while restraining an increase in weight.

According to the construction of the embodiment, because the retaining portion 63 to which the glass run channel 12 is engaged between the upper wall 56 and the lower wall 57 is formed, the glass run channel 12 is retained stably without providing an extra member for retaining the glass run channel 12.

According to the construction of the embodiment, because the retaining portion 63 is formed so that the glass run channel 12 is engaged with the retaining portion 63 at a substantially center portion between the upper wall 56 and the lower wall 57, the glass run channel 12 can be retained more stably.

According to the construction of the embodiment, because the connecting portion 64 connected to the lower wall 57 of the reinforcement rib 62 is formed to dent towards the vehicle inner side relative to the end portion of the lower wall 57 at the vehicle outer side, the glass run channel 12 and the reinforcement ribs 62 are prevented from interfering with one another at the end portion of the lower wall 57 at the vehicle outer side. Thus, because the glass run channel 12 comes to engage with an entire portion of the end portion of the lower wall 57 at the vehicle outer side, the glass run channel 12 can be retained more stably.

According to the construction of the embodiment, the inner extending portion 24 is formed at the end portion of the inner wall 19 at the vehicle outer side and the downwardly extending portion 61 is formed at the end portion of the lower wall 57 at the vehicle outer side. Thus, when removing the burr 81 formed when forming the door frame 4 by die casting, the door frame 4 can be stably supported by the support 82, and a removing operation of burr can be performed effectively and efficiently.

According to the construction of the embodiment, the inner extending portion 24 and the downwardly extending portion 61 are formed so that the respective extending amounts in the forward direction and the downward direction of the vehicle gradually increase towards the vehicle outer side. According to the foregoing construction, by pushing the inner garnish 32 against the door frame 4 from the vehicle inner side, the inner garnish 32 can be readily attached to the door frame 4, and the assembility of the inner garnish 32 can be enhanced. Further, according to the construction of the embodiment, the protruding portion 45 and the protruding portion 76 engage with the inner extending portion 24 and the downwardly extending portion 61, respectively, which allows the inner garnish 32 to be firmly fixed to the door frame 4.

According to the construction of the embodiment, because the main frame portion 6 is made from light alloy material, compared to a case where the main frame portion 6 is made from an iron system material, the weight of the main frame portion 6 can be reduced. However, because strength of the light alloy is lower than the iron system material generally, it is necessary to increase a distance between the upper wall 56 and the lower wall 57 in the upward direction and downward direction of the vehicle in order to ensure the rigidity. Accordingly, the construction of the embodiment in which the glass run channel 12 is engaged with the retaining portion 63 of the reinforcement rib 62 between the upper wall 56 and the lower wall 57 is effective to ensure the rigidity of the main frame portion 6.

According to the construction of the embodiment, because the door frame 4 is integrally formed by light alloy die casting, compared to a case where the pillar portion 5 and the main frame portion 6 are separately formed and connected each other, for example, manufacturing processes of the door frame 4 can be reduced, thus enhancing the manufacturing efficiency.

According to the construction of the embodiment, by the construction that the width of the bottom wall 17 in the front-rear direction of the vehicle at the end closer to the door body 2 is greater than the width of the bottom wall 17 in the front-rear direction of the vehicle at the upper end of the pillar portion 5, the rigidity of the pillar portion 5 is enhanced. The changes in the width of the bottom wall 17 in the front-rear direction of the vehicle does not affect a dimension of a vehicle compartment (vehicle interior) because the pillar portion 5 does not protrude to the vehicle compartment (vehicle interior). Thus, the reduction of the vehicle interior space in the vehicle width direction can be prevented. Accordingly, the rigidity of the pillar portion 5 can be enhanced while ensuring the vehicle interior space.

According to the embodiment, because the widths of the outer wall 18 and the inner wall 19 in the vehicle width direction at the end closer to the door body 2 are formed to be greater than the widths of the outer wall 18 and the inner wall 19 in the vehicle width direction at the upper end of the pillar portion 5, the rigidity of the pillar portion 5 can be sufficiently enhanced.

According to the embodiment, because the first rib 25 which extends from the outer wall 18 towards the vehicle outer side is formed at the envelope portion 11 at the pillar portion 5, the rigidity of the pillar portion 5 can be further enhanced.

According to the embodiment, the first rib 25 is branched from a portion of the outer wall 18 so as to extend in the upward-downward direction of the vehicle while a distance between the first rib 25 and the inner wall 19 in the front-rear direction of the vehicle is assumed to be constant, and the end portion of the first rib 25 at the vehicle outer side is configured to receive the glass run channel 12 (i.e., the glass run channel 12 is engaged with the end portion of the first rib 25 at the vehicle outer side). Namely, the glass run channel 12 having a constant cross section can be stably retained without providing an extra member for holding the glass run channel 12.

According to the embodiment, the fixing portion 14 at the pillar portion 5 is formed by the lateral wall 21 extending in the vehicle rear direction from the end portion of the outer wall 18 at the vehicle outer side and by the vertical wall 22 extending from the end portion of the lateral wall 21 at the vehicle rear side towards the vehicle outer side. Further, the second rib 26, which extends in the vehicle outer side direction and extends in the upward-downward direction of the vehicle to make the distance relative to the inner wall 19 be constant in the front-rear direction of the vehicle, is formed at the fixing portion 14 at the pillar portion 5. Thus, the rigidity of the pillar portion 5 is further enhanced. Further, because the second rib 26 is formed so that the distance relative to the inner wall 19 in the front-rear direction of the vehicle is assumed to be constant, the glass run channel 12 having a constant cross section can be retained by the holding member 13 at the pillar portion 5 having a constant cross section without providing an extra member, for example, a spacer to the second rib 26.

According to the disclosed embodiment, the inner side surface 24a of the inner extending portion 24 is formed in an arc shape. However, the configuration of the inner side surface 24a of the inner extending portion 24 is not limited to the foregoing construction. Alternatively, for example, the inner side surface 24a at the vehicle inner side may be linearly formed so as to be gradually closer to the inner wall 19. Further, alternatively, the inner side surface 24a at the vehicle inner side may be formed substantially orthogonal to the inner wall 19 so that the extending amount of the inner extending portion 24 sharply increases towards the vehicle outer side. Similarly, for example, the inner side surface 61a of the downwardly extending portion 61 may be linearly formed so as to be gradually closer to the lower wall 57. Further, alternatively, the extending amount of the downwardly extending portion 61 may sharply increase towards the vehicle outer side.

According to the embodiment, the inner extending portion 24 and the downwardly extending portion 61 are formed at the end portions of the inner wall 19 and the lower wall 57, respectively, at the vehicle outer side. However, alternatively, the inner extending portion 24 and the downwardly extending portion 61 may not be provided.

According to the embodiment, the retaining portion 63 of the reinforcement rib 62 is formed so that the glass run channel 12 is engaged at a substantially center portion of the envelope portion 51 at the main frame portion 6 in the upward-downward direction of the vehicle. Alternatively, the retaining portion 63 may be configured to retain the glass run channel 12 at a position closer to the upper wall 56 relative to the center or at a position closer to the lower wall 57 relative to the center.

According to the embodiment, the retaining portion 63 is formed at the reinforcement rib 62. However, alternatively, the retaining portion 63 may not be provided.

According to the embodiment, the connecting portion 64 of the reinforcement rib 62 is dented in the vehicle inner side direction relative to the end portion of the lower wall 57 at the vehicle outer side. However, alternatively, the connecting portion 64 of the reinforcement rib 62 may not be dented in the vehicle inner side direction relative to the end portion of the lower wall 57 at the vehicle outer side.

According to the embodiment, the reinforcement rib 62 is arranged to be zigzag alternately. However, the arrangement of the reinforcement rib 62 is not limited to the foregoing construction, and any construction is applicable to the reinforcement rib 62 as long as extending from the bottom wall 55 towards the vehicle outer side and connecting the upper wall 56 and the lower wall 57. For example, the reinforcement ribs 62 may be arranged so that the adjacent reinforcement ribs 62 are arranged to be in substantially parallel to one another. Further, the number and the configuration of the reinforcement rib 62 are changeable.

Figure 8:
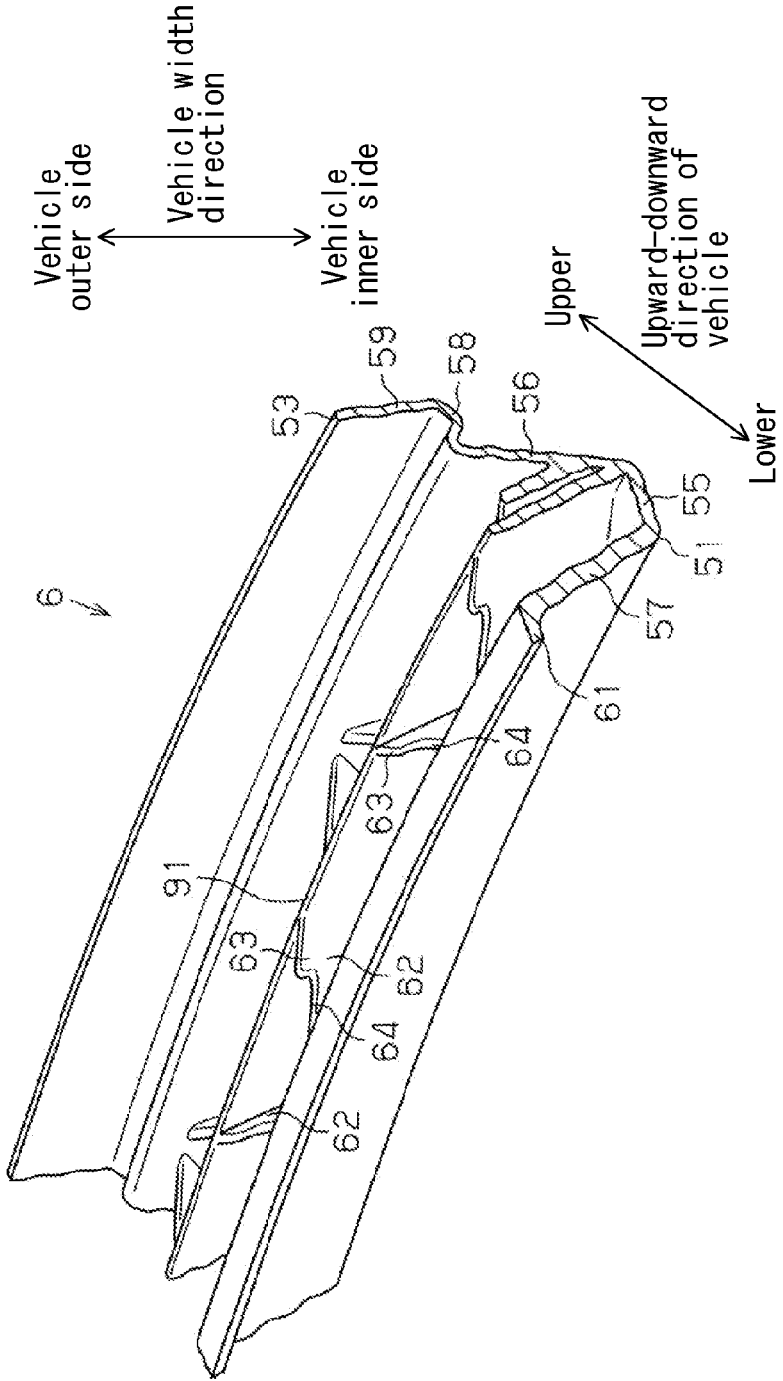
FIG. 8 is an enlarged perspective view of a main frame portion viewed from an outside of the vehicle according to a first modified example of the embodiment.

A first modified example of the embodiment will be explained hereinafter. In addition to the retaining portion 63 of the reinforcement rib 62, a retaining rib for supporting the glass run channel 12 may be formed. For example, as illustrated in FIG. 8, a retaining rib 91 extends to the vehicle outer side from the bottom wall 55 at a center in the upward-downward direction of the vehicle to extend in a longitudinal direction of the main frame portion 6 so that a distance between the upper wall 56 and the lower wall 57 in the upward-downward direction of the vehicle is assumed to be substantially constant. Namely, a level of a lateral surface of the retaining rib 91 corresponding to a vehicle upper side accords to a level of the end portion of the retaining portion 63 at the vehicle upper side. According to the foregoing construction, the main frame attachment portion 47 of the glass run channel 12 is engaged with the retaining rib 91 over a wide range in the longitudinal direction of the main frame portion 6 between the upper wall 56 and the lower wall 57, thus the glass run channel 12 can be retained more stably. According to the example shown in FIG. 8, the glass run channel 12 is engaged with the retaining rib 91 at the center in the upward-downward direction of the vehicle, however, alternatively, the retaining rib 91 may be arranged at a position so that the glass run channel 12 is engaged with the retaining rib 91 at a position closer to the upper wall 56 relative to the retaining portion 63 or at a position closer to the lower wall 57 relative to the retaining portion 63.

Figure 9:
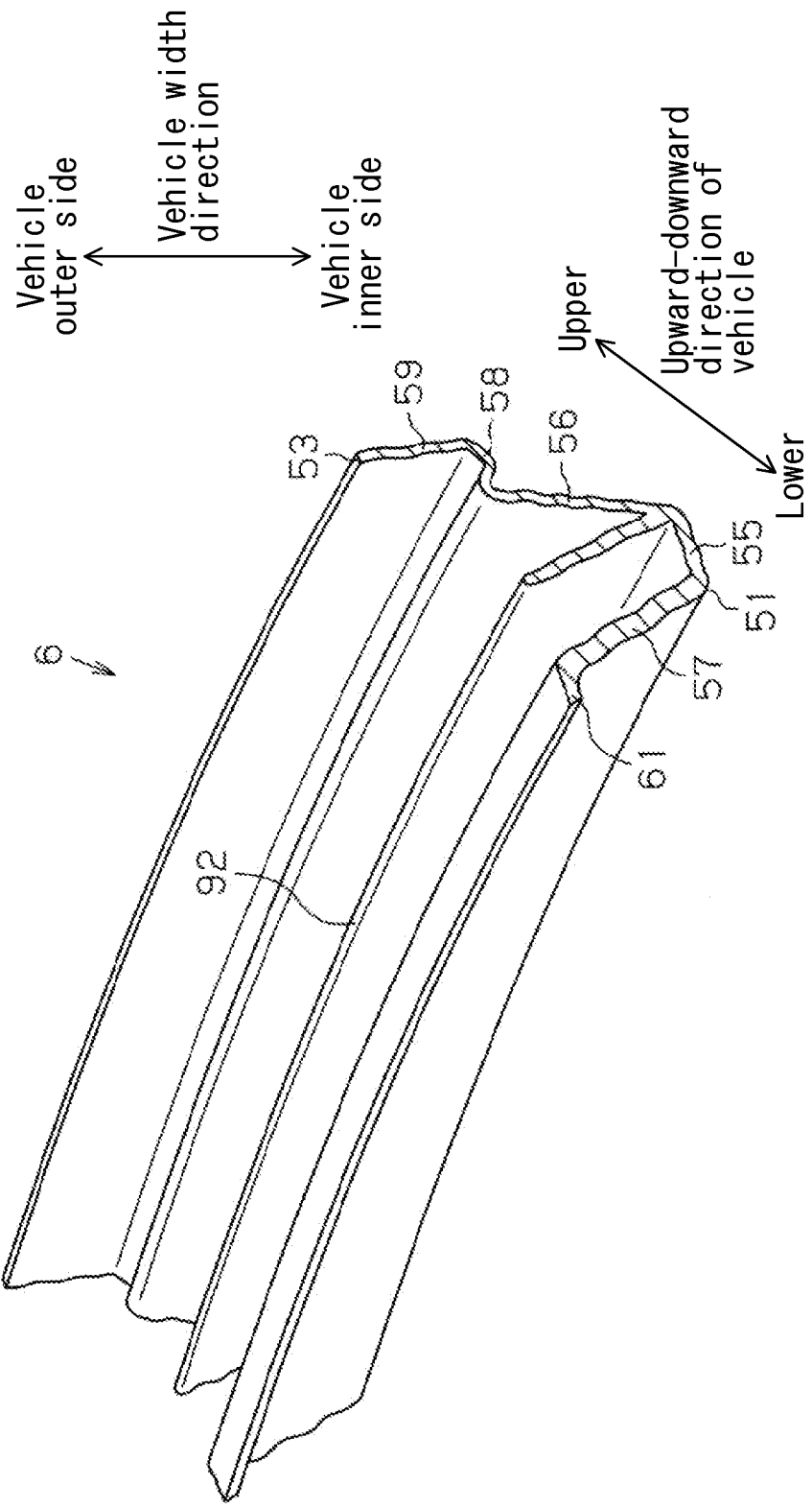
FIG. 9 is an enlarged perspective view of a main frame portion viewed from an outside of the vehicle according to a second modified example of the embodiment.

A second modified example will be explained hereinafter. According to the embodiment, the reinforcement ribs 62 are formed at the envelope portion 51 at the main frame portion 6. However, alternatively, the reinforcement ribs 62 may not be provided at the envelope portion 51 and a retaining rib for supporting the glass run channel 12 may be formed. For example, as illustrated in FIG. 9, a retaining rib 92 extends to the vehicle outer side from the bottom wall 55 at a center in the upward-downward direction of the vehicle and extends in a longitudinal direction of the main frame portion 6 so that a distance between the upper wall 56 and the lower wall 57 in the upward-downward direction of the vehicle is assumed to be substantially constant. According to the foregoing construction, because the main frame attachment portion 47 of the glass run channel 12 is engaged with the retaining rib 92 over a wide range in the longitudinal direction of the main frame portion 6 between the upper wall 56 and the lower wall 57, the glass run channel 12 can be retained stably. According to the construction illustrated in FIG. 9, the retaining rib 92 is provided at a position so that the glass run channel 12 is engaged at a position substantially center in the upward-downward direction of the vehicle, however, alternatively, the retaining rib 92 may be arranged at a position so that the glass run channel 12 is engaged at a position closer to the upper wall 56 relative to the retaining portion 63 or close to the lower wall 57 relative to the retaining portion 63. Further, alternatively, the retaining rib 92 may be divided into plural sections along the longitudinal direction of the main frame portion 6, for example.

According to the aforementioned embodiment, the first rib 25 is branched from a portion of the outer wall 18. Alternatively, the first rib 25 may be formed to be entirely spaced away from both the outer wall 18 and the inner wall 19. Further alternatively, the distance between the first rib 25 and the inner wall 19 may not be constant. For example, plural first ribs 25 may be formed at the envelope portion 11 at the pillar portion 5, and the plural first ribs 25 may be arranged in a zigzag pattern. Further alternatively, the first rib 25 may not be formed.

According to the aforementioned embodiment, the second rib 26 is branched from a portion of the vertical wall 22, and the lateral wall 21 is divided into the vehicle front side portion and the vehicle rear side portion. Alternatively, for example, the second rib 26 may be formed to be entirely spaced away from the vertical wall 22. Further alternatively, the second rib 26 may not be formed.

According to the aforementioned embodiment, the width of the bottom wall 17 in the front-rear direction of the vehicle gradually increases from the upper end side of the pillar portion 5 towards the door body 2. Alternatively, for example, the width of the bottom wall 17 in the front-rear direction of the vehicle may increase stepwise. Similarly, the width of each of the outer wall 18 and the inner wall 19 in the vehicle width direction may increase stepwise from the upper end side of the pillar portion 5 towards the door body 2. Alternatively, the width of each of the bottom wall 17, the outer wall 18, and the inner wall 19 in the vehicle width direction may be constant along the upward-downward direction of the vehicle.

According to the aforementioned embodiment, the outer garnish 31 and the inner garnish 32 are made of synthetic resin. Alternatively, the outer garnish 31 and the inner garnish 32 may be made of rubber or metal. Further, the door frame 4 may be made of iron system material, for example, instead of light alloy.

According to the aforementioned embodiment, the pillar portion 5, the main frame portion 6, the inner reinforcement 7, the hinge bracket 8, and the lock reinforcement 9 are integrally formed by light alloy die-casting. Alternatively, the aforementioned portions may be separately formed and then connected to one another by welding, for example.

The inner reinforcement 7, the hinge bracket 8, and the lock reinforcement 9 may not be formed at the door frame 4. The door frame 4 may be formed by cutting, for example, instead of die-casting.

The door frame 4 of the embodiment may be applied to a door frame for a rear door of a vehicle besides the front door 1.

According to the construction of the embodiment, the door frame (4) for the vehicle includes the pillar portion (5) fixed to the upper end portion of the door body (2) and extending in the upward direction of the vehicle, the main frame portion (6) connected to the upper end of the pillar portion (5) and extending in the forward direction or the rearward direction of the vehicle to be fixed to the upper end portion of the door body (2), the envelope portion (51) provided at the main frame portion (6), the envelope portion (51) serving as a framework of the main frame portion (6) and opening to a vehicle outer side, the fixing portion (53) provided at the main frame portion (6), the fixing portion (53) fixing the holding member (52) for holding the glass run channel (12) together with the envelope portion (51), the bottom wall (55) provided at the envelope portion (51) and positioned at the vehicle inner side, the upper wall (56) provided at the envelope portion (51) and extending from the end portion of the bottom wall (55) at a vehicle upper side towards the vehicle outer side, the lower wall (57) provided at the envelope portion (51) and extending from the end portion of the bottom wall (55) at a vehicle lower side towards the vehicle outer side, and at least one reinforcement rib (62) formed at the envelope portion (51), the reinforcement rib (62) extending from the bottom wall (55) towards the vehicle outer side and connecting the upper wall (56) and the lower wall (57).

According to the disclosure, the envelope portion (51) is divided by the reinforcement rib (62) extending from the bottom wall (55) towards the vehicle outer side and connecting the upper wall (56) and the lower wall (57). That is, according to the construction of the disclosure, by configuring the envelope portion (51) as combinations of the plural tubes with bottoms which open to the vehicle outer side schematically describing, the rigidity of the main frame portion (6) against the torsional force is enhanced. Thus, because a thickness of the envelope portion (51) is not required to be increased, the rigidity of the main frame portion (6) can be enhanced while restraining an increase in weight.

According to the door frame (4) includes the retaining portion (63) formed at the reinforcement rib (62), the retaining portion (63) being configured to be engaged with the glass run channel (12) at a position between the upper wall (56) and the lower wall (57).

According to the foregoing construction, the glass run channel (12) can be retained stably without providing an extra member for retaining the glass run channel (12).

According to the construction of the embodiment, the retaining portion (63) is formed in a manner that the glass run channel (12) is engaged at a center position between the upper wall (56) and the lower wall (57).

According to the foregoing construction, because the glass run channel (12) is supported by the retaining portion (63) at a center position between the upper wall (56) and the lower wall (57), the glass run channel (12) can be retained more stably.

According to the construction of the embodiment, the door frame (4) for the vehicle includes the connecting portion (64) formed at the reinforcement rib (62) for connecting the reinforcement rib (62) and the lower wall (57), the connecting portion (64) being dented towards the vehicle inner side relative to the end portion of the lower wall (57) at the vehicle outer side.

According to the foregoing construction, because an interference of the glass run channel (12) and the reinforcement rib (62) from each other is prevented, which allows the glass run channel (12) to engage with the entire end portion of the lower wall (57) at the vehicle outer side, the glass run channel (12) can be more stably retained.

According to the construction of the embodiment, the door frame (4) for the vehicle includes the retaining rib (91, 92) formed at the envelope portion (51) to extend in a longitudinal direction of the main frame portion (6) to make a distance between the upper wall (56) and the lower wall (57) constant, the retaining rib (91, 92) configured to retain the glass run channel (12).

According to the foregoing construction, because the glass run channel (12) is engaged with the retaining rib (91, 92) over a wide range in the longitudinal direction of the main frame portion (6) between the upper wall (56) and the lower wall (57), the glass run channel (12) can be more stably retained.

According to the construction of the embodiment, the door frame (4) for the vehicle includes the extending portion (61) formed at the end portion of the lower wall (57) at the vehicle outer side and extending in a downward direction of the vehicle. The main frame portion (6) is formed by a die-casting.

In case of forming the main frame portion (6) by die casting, generally, a burr protruding towards the downward direction of the vehicle is formed at an end portion of the lower wall (57) at the vehicle outer side. The burrs are sheared by a jig to be removed from the lower wall (57) in a state where the main frame portion (6) is fixed by contacting the end portion of the lower wall (57) at the vehicle outer side to a support (82), for example. Thus, by the extending portion (61) formed at the end portion of the lower wall (57) at the vehicle outer side, the main frame portion (6) can be stably supported by the support (82), which allows to remove the burrs effectively and efficiently.

According to the construction of the embodiment, the door frame (4) for the vehicle includes the inner garnish (32) including the protruding portion (76) engaging with the extending portion (61), the inner garnish (32) attached to the main frame portion (6) for covering the main frame portion (6) from an vehicle inner side. The extending amount of the extending portion (61) extending in the downward direction of the vehicle gradually increases towards the vehicle outer side.

According to the foregoing construction, because the extending amount of the extending portion in the downward direction of the vehicle gradually increases towards the vehicle outer side, by pushing the inner garnish (32) from the vehicle inner side against the main frame portion (6) so that the protruding portion (76) moves along the lower wall (57), the inner garnish (32) is deformed so that the protruding portion (76) moves along the extending portion (61), and the protruding portion (76) engages with the extending portion (61). Thus, according to the foregoing construction, the inner garnish (32) can be attached to the main frame portion (6) by pushing the inner garnish (32) against the main frame portion (6), and the assembly of the inner garnish (32) can be enhanced. Further, according to the foregoing construction, because the protruding portion (76) engages with the extending portion (61), the inner garnish (32) can be securely fixed to the main frame portion (6).

According to the construction of the embodiment, the reinforcement rib (62) includes the plural reinforcement ribs (62) each of which are formed in a quadrilateral plate shape and which are arranged in the zigzag pattern along the longitudinal direction of the main frame portion (6).

According to the construction of the embodiment, the door frame (4) for a vehicle includes the pillar portion (5) fixed to an upper end portion of a door body (2) and extending in an upward direction of the vehicle, the main frame portion (6) connected to an upper end of the pillar portion (5) and extending in a forward direction or a rearward direction of the vehicle to be fixed to the upper end portion of the door body (2), the envelope portion (51) provided at the main frame portion (6), the envelope portion (51) serving as a framework of the main frame portion (6) and opening to a vehicle outer side, the fixing portion (53) provided at the main frame portion (6), the fixing portion (53) fixing a holding member (52) for holding a glass run channel (12) together with the envelope portion (51), the bottom wall (55) provided at the envelope portion (51) and positioned at a vehicle inner side, the upper wall (56) provided at the envelope portion (51) and extending from an end portion of the bottom wall (55) at a vehicle upper side towards the vehicle outer side, the lower wall (57) provided at the envelope portion (51) and extending from an end portion of the bottom wall (55) at a vehicle lower side towards the vehicle outer side, and the retaining rib (91, 92) formed at the envelope portion (51), extending towards the vehicle outer side, and retaining the glass run channel (12) between the upper wall (56) and the lower wall (57).

According to the foregoing construction, because the glass run channel (12) is engaged with the retaining rib (91, 92), the glass run (12) can be stably retained.

According to the construction of the disclosure, the rigidity of the main frame portion (6) of the door frame (4) for the vehicle is enhanced while restraining an increase in weight.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:
1. A door frame for a vehicle, comprising:
a pillar portion fixed to an upper end portion of a door body and extending in an upward direction of the vehicle;
a main frame portion connected to an upper end of the pillar portion and extending in a forward direction or a rearward direction of the vehicle to be fixed to the upper end portion of the door body;
an envelope portion provided at the main frame portion, the envelope portion serving as a framework of the main frame portion and opening to a vehicle outer side;
a fixing portion provided at the main frame portion, the fixing portion fixing a holding member for holding a glass run channel together with the envelope portion;
a bottom wall provided at the envelope portion and positioned at a vehicle inner side;

an upper wall provided at the envelope portion and extending from an end portion of the bottom wall at a vehicle upper side towards the vehicle outer side;

a lower wall provided at the envelope portion and extending from an end portion of the bottom wall at a vehicle lower side towards the vehicle outer side;

at least one reinforcement rib formed at the envelope portion, the reinforcement rib extending from the bottom wall towards the vehicle outer side and connecting the upper wall and the lower wall; and a retaining portion formed at the reinforcement rib, the retaining portion being configured to be engaged with the glass run channel at a position between the upper wall and the lower wall.

2. The door frame for the vehicle according to claim 1, wherein the retaining portion is formed in a manner that the glass run channel is engaged at a center position between the upper wall and the lower wall.

3. The door frame for the vehicle according to claim 1, further comprising:

a connecting portion formed at the reinforcement rib for connecting the reinforcement rib and the lower wall, the connecting portion being dented towards a vehicle inner side relative to an end portion of the lower wall at the vehicle outer side.

4. The door frame for the vehicle according to claim 1, further comprising:

a retaining rib formed at the envelope portion to extend in a longitudinal direction of the main frame portion to make a distance between the upper wall and the lower wall constant, the retaining rib configured to retain the glass run channel.

5. The door frame for the vehicle according to claim 4, further comprising:

a connecting portion formed at the reinforcement rib for connecting the reinforcement rib and the lower wall, the connecting portion being dented towards a vehicle inner side relative to an end portion of the lower wall at the vehicle outer side.

6. The door frame for the vehicle according to claim 2, further comprising:

a connecting portion formed at the reinforcement rib for connecting the reinforcement rib and the lower wall, the connecting portion being dented towards a vehicle inner side relative to an end portion of the lower wall at the vehicle outer side.

7. The door frame for the vehicle according to claim 1, further comprising:

an extending portion formed at an end portion of the lower wall at the vehicle outer side and extending in a downward direction of the vehicle; wherein the main frame portion is formed by a die-casting.

8. The door frame for the vehicle according to claim 7, further comprising:

an inner garnish including a protruding portion engaging with the extending portion, the inner garnish attached to the main frame portion for covering the main frame portion from an vehicle inner side; wherein an extending amount of the extending portion extending in the downward direction of the vehicle gradually increases towards the vehicle outer side.

9. The door frame for the vehicle according to claim 1, wherein the reinforcement rib includes the plural reinforcement ribs each of which are formed in a quadrilateral plate shape and which are arranged in a zigzag pattern along the longitudinal direction of the main frame portion.

10. A door frame for a vehicle, comprising:

a pillar portion fixed to an upper end portion of a door body and extending in an upward direction of the vehicle;

a main frame portion connected to an upper end of the pillar portion and extending in a forward direction or a rearward direction of the vehicle to be fixed to the upper end portion of the door body;

an envelope portion provided at the main frame portion, the envelope portion serving as a framework of the main frame portion and opening to a vehicle outer side;

a fixing portion provided at the main frame portion, the fixing portion fixing a holding member for holding a glass run channel together with the envelope portion;

a bottom wall provided at the envelope portion and positioned at a vehicle inner side;

an upper wall provided at the envelope portion and extending from an end portion of the bottom wall at a vehicle upper side, the upper wall extending towards the vehicle outer side;

a lower wall provided at the envelope portion and extending from an end portion of the bottom wall at a vehicle lower side, the lower wall extending towards the vehicle outer side; and a retaining rib formed at the envelope portion, theretaining rib being positioned between the upper wall and the lower wall, the retaining rib extending towards the vehicle outer side, the retaining rib being configured to have mounted thereon the glass run channel to retain the glass run channel between the upper wall and the lower wall.

11. The door frame for the vehicle according to claim 10, further comprising a lateral wall extending from an end portion of the upper wall in an upward direction of the vehicle.

12. The door frame for the vehicle according to claim 11, further comprising a longitudinal wall extending from an upper end portion of the lateral wall toward the vehicle outer side.

* * * * *